United States Patent [19]

Elia

[11] Patent Number: 5,331,903
[45] Date of Patent: Jul. 26, 1994

[54] SYSTEM FOR CONTROLLING THE ROTATION OF THE BODY OF A RAILWAY VEHICLE ABOUT ITS LONGITUDINAL AXIS

[75] Inventor: Alessandro Elia, Turin, Italy

[73] Assignee: Fiat Ferroviaria S.p.A., Turin, Italy

[21] Appl. No.: 19,769

[22] Filed: Feb. 19, 1993

[30] Foreign Application Priority Data

Feb. 24, 1992 [IT] Italy ............ TO92A000144

[51] Int. Cl.$^5$ .............................................. B61F 5/00
[52] U.S. Cl. .................... 105/199.2; 105/164
[58] Field of Search ............. 105/168, 167, 199.2, 105/199.1, 453, 164; 280/707, 6.1; 364/424.01, 424.03, 424.05, 463

[56] References Cited

U.S. PATENT DOCUMENTS

| | | | |
|---|---|---|---|
| 3,683,818 | 8/1972 | Meir et al. ............ | 105/199.2 |
| 3,789,769 | 2/1974 | Strohmer et al. ........ | 105/199.2 |
| 3,844,225 | 10/1974 | Di Majo ............... | 105/199.2 |
| 3,918,369 | 11/1975 | Kitaoka et al. ......... | 105/164 |
| 4,267,736 | 5/1981 | Westbeck .............. | 105/164 |
| 4,867,476 | 9/1989 | Yamanaka et al. ........ | 280/714 |

FOREIGN PATENT DOCUMENTS 0303777 2/1989 European Pat. Off. .
1933893 2/1970 Fed. Rep. of Germany .
1595143 7/1970 France .
2340216 9/1977 France .

Primary Examiner—Mark T. Le
Attorney, Agent, or Firm—Ladas & Parry

[57] ABSTRACT

The system of the invention comprises a gyroscope having two degrees of freedom fixed to a carriage of the vehicle and having a first axis of sensitivity disposed in the longitudinal direction of the carriage and a second axis of sensitivity disposed in the vertical direction; the gyroscope is operable to generate a first signal indicative of the angular velocity $\omega_x$ about a first axis disposed in the said longitudinal direction and a second signal indicative of the angular velocity $\omega_z$ of the carriage about a second, vertical axis; the system further includes a tachometric detector operable to generate a signal indicating the speed v of the vehicle and at least one integrator operable to integrate the first said signal to generate a signal indicating the angle of rotation $\phi_x$ of the carriage about the longitudinal axis; a microprocessor forms the product of the signal indicating the angle of rotation and the acceleration due to gravity g and the product of the signal indicating the speed v and the signal indicating the angular velocity $\omega_z$ and finally takes the difference between the second product and the first in such a way as to obtain a signal indicating the non-compensated transverse acceleration.

6 Claims, 5 Drawing Sheets

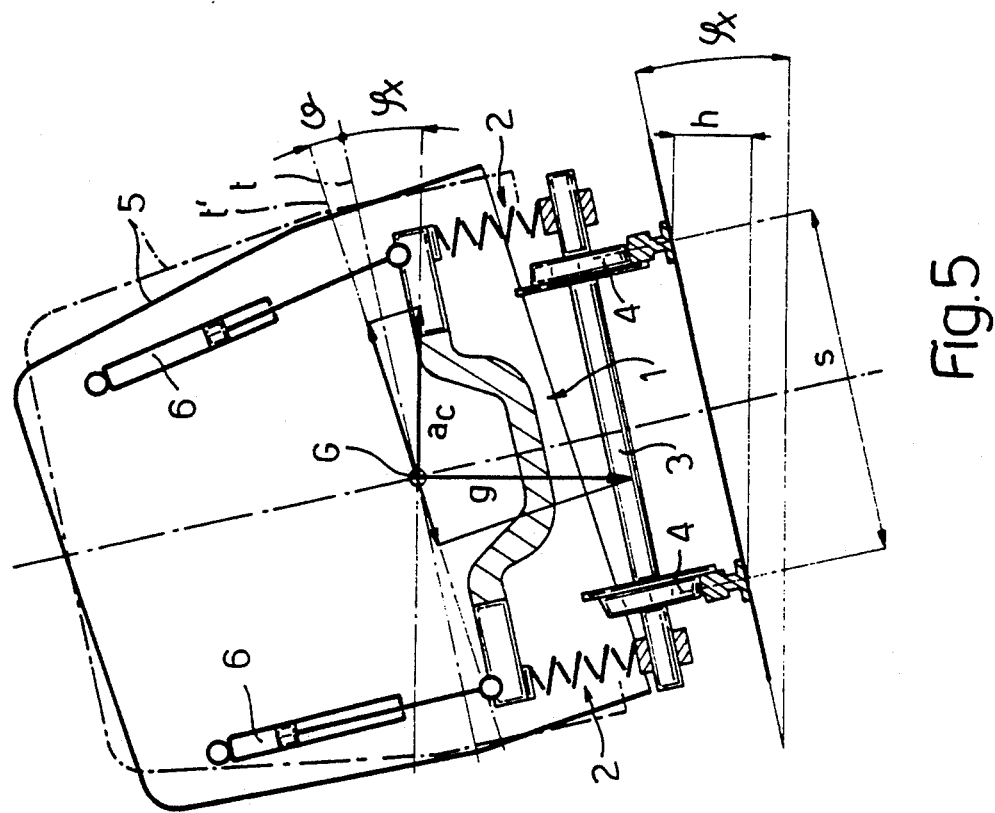
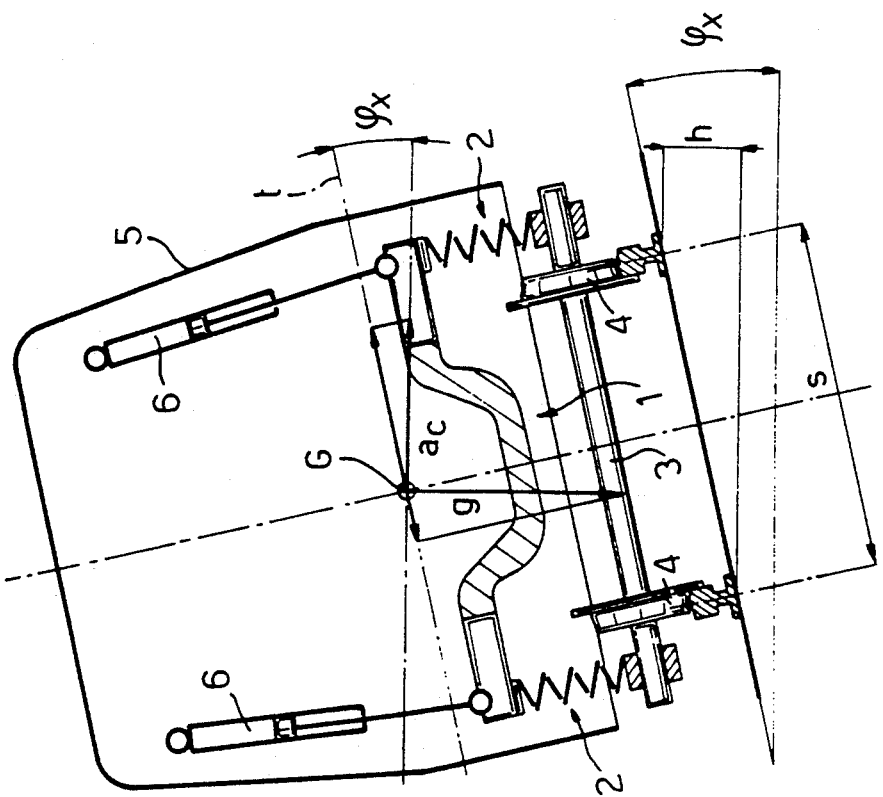
Fig. 4
Fig. 5

SYSTEM FOR CONTROLLING THE ROTATION OF THE BODY OF A RAILWAY VEHICLE ABOUT ITS LONGITUDINAL AXIS

BACKGROUND OF THE INVENTION

The present invention relates to a system for controlling the rotation of the body of a railway vehicle about its longitudinal axis for the purpose of reducing the value of non-compensated acceleration acting in a transverse direction on passengers in the vehicle.

Variable aspect railway vehicles are known which, when travelling around a bend, allow the body to rotate about a longitudinal axis with respect to the track. This rotation, which can take place in a spontaneous or a controlled manner, makes it possible partly or totally to compensate for the component of the centrifugal force which acts on the passengers, by means of a component of the passengers' weights. Therefore, when a variable aspect vehicle travels along a curved path, a residual acceleration acts in a transverse direction on the passengers, which acceleration is defined as non-compensated acceleration and which is therefore equal to the difference between the components of centrifugal acceleration and gravitational acceleration in the said transverse direction.

The rotation of the body of the railway vehicle can take place in a spontaneous manner under the action of the forces of centrifugal inertia acting on the centre of gravity of this body, which, by means of suitable linkages, causes rotation of the body itself towards the inside of the curve. This system has the disadvantage of imparting to the body an acceleration which is too slow because of its high moment of inertia to rolling movement and because of the modest value of the couples thus generated. Therefore with this mode of operation the equilibrium position cannot be reached within the short time which is available during the transition between rectilinear movement and the full curve of the bend. It therefore happens that the compensation of the centrifugal force is insufficient along the connection portion and, as a consequence of this, the passengers can be subject to an intense (if relatively short) jolt and to an accentuated oscillation of the transverse acceleration which lasts into the bend and which can be very annoying. Both of these unfavourable effects limit the maximum admissable angle of rotation of the body to modest values (of the order of 3°-4°) and therefore reduce to relatively limited values (of the order of 10-15%) the maximum increase of speed in bends.

For this reason the controlled or active system of rotation predominates, in which, by providing sufficiently powerful servo-controls, it is possible to move the body with all the necessary speed and make this perform the rotation smoothly and quickly. The operation of the servo-controls was initially achieved by a device sensitive to the transverse acceleration on the body itself, such as, for example, a pendulum having a longitudinal axis or an accelerometer fitted to the body; subsequently one or more accelerometers fitted to the carriage or to the carriages of the vehicle were used as an alternative.

Since with this system there was no possibility of distinguishing if the transverse accelerations to which the device was subjected were due to centrifugal force or were disturbances caused by irregular motions of the vehicle (in particular the phenomenon of rocking almost always present in the operation of railway vehicles) sometimes untimely interventions occurred.

To avoid this disadvantage it was necessary to fit a filter either to the movement of the pendulum or to the accelerometric signal generated by the said device; this filter acts at very low frequency and causes a delay in the transmissions of the control used for rotation, and a reduction in the time available to perform the change in aspect, resulting in an unpleasant oscillation in the residual transverse acceleration on the passengers. For the purpose of underlining the importance of the problems which arise for controlling the body aspect it must be borne in mind that at 200 kilometers per hour a parabolic transition section of 100 meters is traversed in about 2 seconds and that within this time it is necessary to perceive the presence of the curve, actuate the servo-control, accelerate the body, cause this to perform the entire rotation, slow and stop in the inclined position.

In Italian Patent No 920358 by the same applicant, filed Feb. 9, 1971, there is described a body rotation control system for a railway vehicle which makes it possible to detect, with a minimum delay, the beginning and end of the linking sections both at the beginning and the end of a bend in the railway track travelled by the vehicle, even if the track itself is elevated; this system further determines, in a timely and correct manner, the rotation of the body necessary to compensate the transverse acceleration. The system substantially comprises a gyroscope operable to generate a signal indicative of the angular velocity of rotation of the vehicle about is longitudinal axis, an integrator operable to generate a signal indicative of the angle of rotation of the vehicle about the said axis and a threshold adapted to allow the passage of this signal only when this exceeds a predetermined value in such a way as to give rise to a true and proper switch device adapted to emit an activation signal for the actuator displacing the body only when the angle of rotation of the vehicle exceeds a desired value.

The control system described was able to operate quickly and in a timely manner only if the track was elevated at the connector section (that is to say only if one of the rails is located at a different height with respect to the other) linking the rectilinear section and the bend. Otherwise, that is to say if the connector section was not elevated, it was not able to recognise the actuation phases.

Incorrect operation was furthermore encountered in cases in which the increase in the elevation varied with a different law from that with which the curvature of the track varied and, therefore, in the case of S-shape elevated connector links, connector links having double curvature or connector links having differently accentuated curves.

SUMMARY OF THE INVENTION

The object of the present invention is that of providing a system for controlling the rotation of the body of a railway vehicle about its longitudinal axis, of the type described above, by means of which the above mentioned disadvantages are overcome.

This object is achieved by means of a system for controlling the rotation of the body of a railway vehicle about its longitudinal axis, for the purpose of reducing the value of the non-compensated acceleration acting in a transverse direction on passengers in the vehicle, the said rotation being controlled by at least one actuator driven by a servo valve controlled by a control signal from an actuator control unit, characterised in that it comprises:

at least one gyroscope having two degrees of freedom fixed to a carriage of the vehicle and having a first axis of sensitivity disposed in the longitudinal direction of the said carriage and a second axis of sensitivity disposed in a vertical direction, the said gyroscope being operable to generate a first electrical signal indicative of the angular velocity $\omega_x$ of the said carriage about its first axis x disposed in the said longitudinal direction and a second electrical signal indicative of the angular velocity $\omega_z$ of the said carriage about a second, vertical axis z;

at least one tachometric detector operable to generate a signal indicative of the speed v of the said vehicle;

at least a first integrator operable to integrate the said first signal indicative of the angular velocity $\omega_x$ to generate a signal indicative of the angle of rotation $\phi_x$ of the carriage about the said longitudinal axis x;

a microprocessor comprising at least one first calculation unit operable to form the product of the said signal indicative of the said angle of rotation $\phi_x$ and the gravitational acceleration g and a second calculation unit operable to form the the product of the said signal indicative of the speed v and the said signal indicative of the angular velocity $\phi_x$ and to take the difference between the second product and the first product in such a way as to obtain a signal indicative of the said non-compensated transverse acceleration:

$$a_{nc} = \omega_z v - g\phi_x$$

the said signal indicative of the said non-compensated acceleration being delivered to the said control unit to generate the said control signal.

BRIEF DESCRIPTION OF THE DRAWINGS

For a better understanding of the control system of the invention a more detailed description will now be given, by way of example, with reference to the accompanying drawings, in which:

FIGS. 4 and 5 are schematic sections of a variable aspect railway vehicle moving in a curved path in two different configurations, in the first of which the body has not been subjected to any rotation with respect to the rest position and in the second of which it is rotated by a certain angle;

Figure 1:
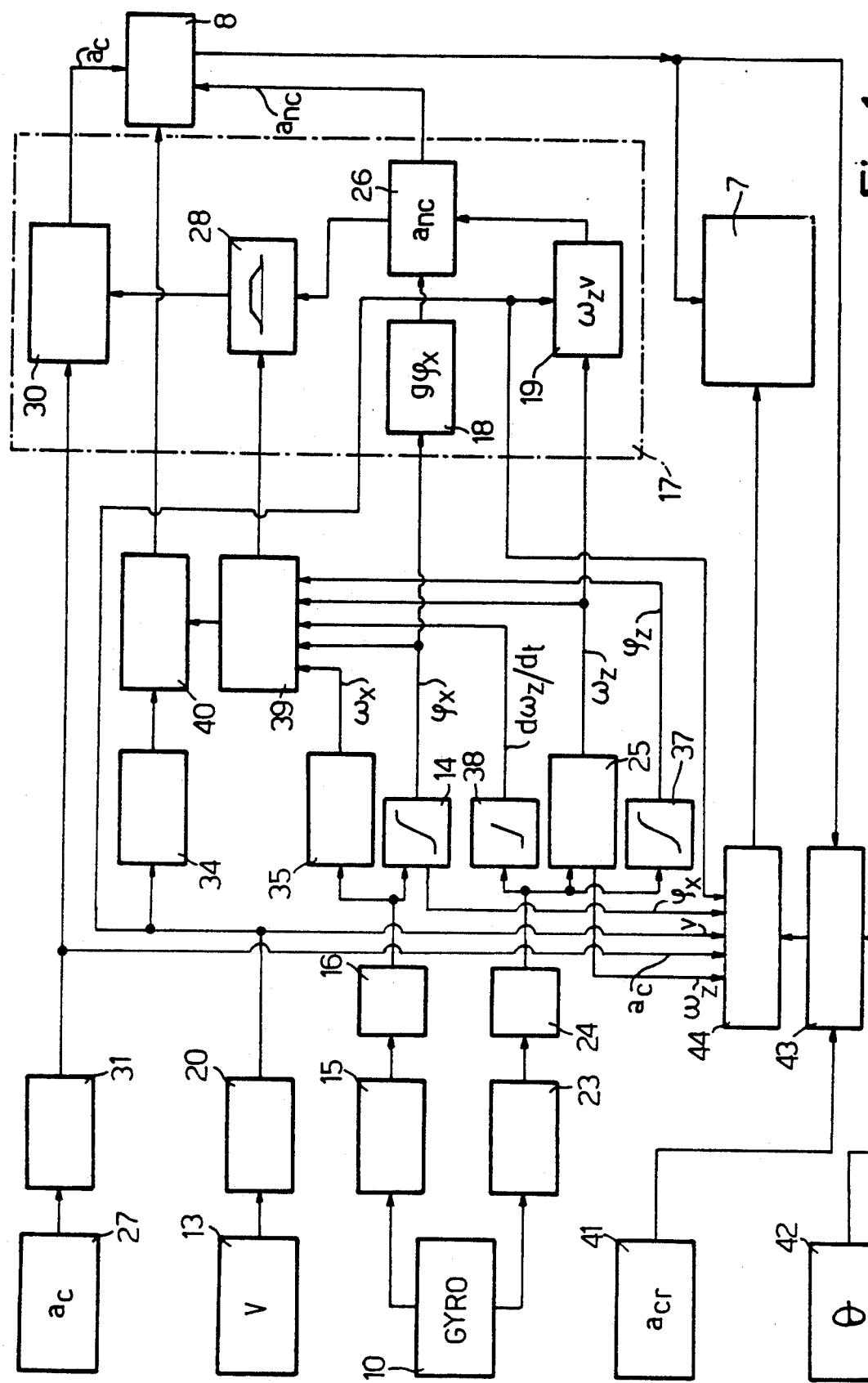
FIG. 1 is a block diagram of the fundamental components of the system of the invention.

Figures from 6 to 10 are diagrammatic representations of signals representing geometrical parameters and accelerations as a function of time, generated by components and devices of the system of FIG. 1; and Figures from 11 to 16 represent other diagrams of signals generated by components and devices of the system of FIG. 1.

DETAILED DESCRIPTION OF THE INVENTION

Figure 2:
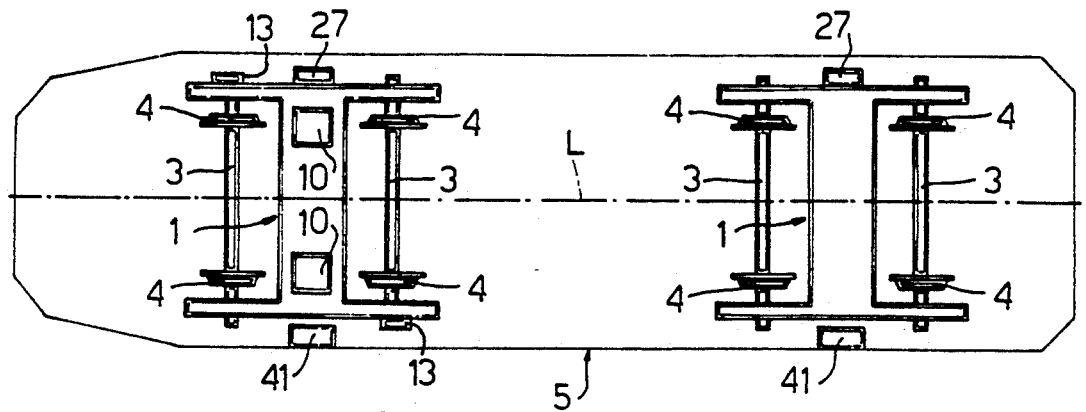
FIG. 2 is a schematic plan view of a railway vehicle.

A variable aspect railway vehicle substantially comprises two or more carriages 1 schematically represented in FIGS. 2, 4 and 5, each carriage 1 is resiliently connected by means of a suspension 2 to axles 3 which have fixed wheels 4; the vehicle further comprises a body 5 rotatable under the action of hydraulic actuators 6 substantially about a longitudinal axis L (FIG. 2) along the centre of gravity G.

When the vehicle travels along a curved path, as has been schematically shown in FIG. 4, a non-compensated acceleration acts on the passengers in the transverse direction defined by the line t, equal to:

$$a_{nc} = \frac{v^2}{R}(\cos\phi_x - g\sin\phi_x)$$

In which v indicates the speed of the vehicle, R the radius of the curve, g the acceleration due to gravity and $\phi_x$ the angle formed by the generatrix of the cone which defines the plane on which the vehicle is supported with respect to the horizontal plane.

As is known, because of the small value of the angle the expression for non-compensated acceleration can be written, to a good approximation, in the following form:

$$a_{nc} = \frac{v^2}{R} - g\phi_x$$

The value of the non-compensated acceleration can suitably be reduced by rotating the body through an angle $\theta$ about its longitudinal axis, as has been shown in FIG. 5. In this case, in fact, the value of non-compensated acceleration will assume the value $$a'_{nc} = \frac{v^2}{R} - g(\phi_x + \theta)$$

obviously less than before.

Figure 3:
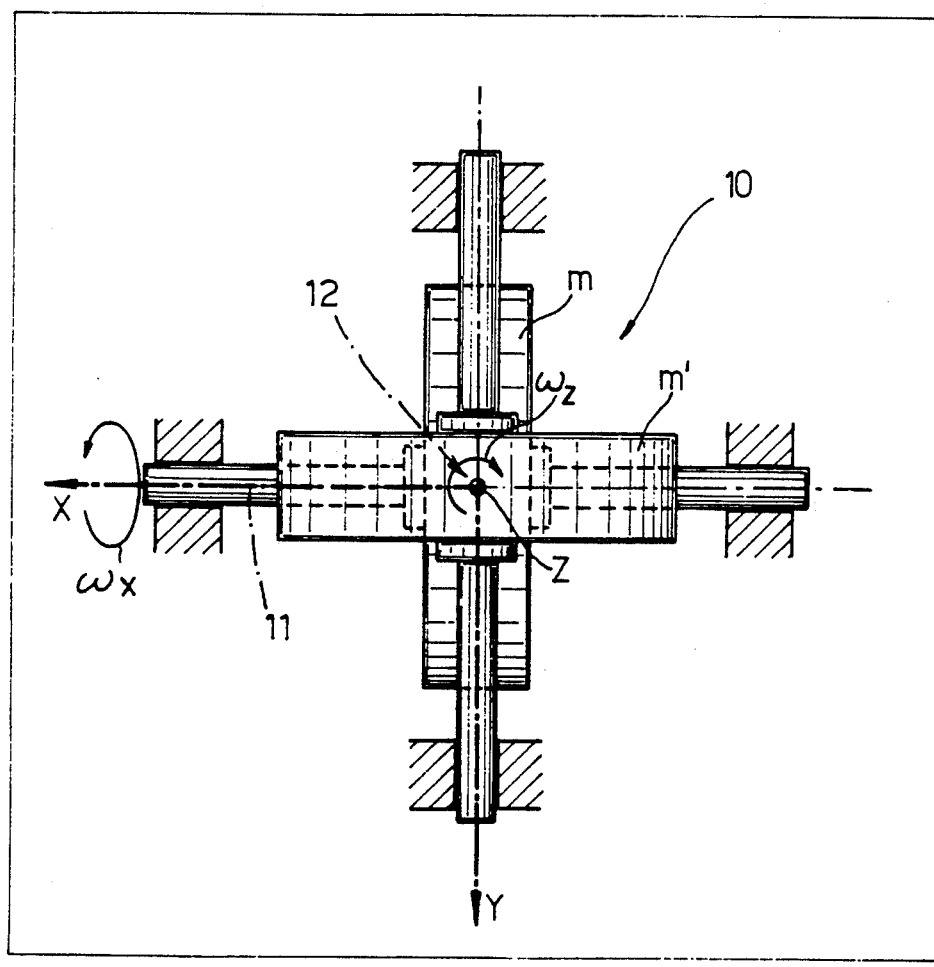
FIG. 3 is a schematic plan view of a gyroscope mounted on a carriage of the vehicle of FIG. 2.

The system of the invention for controlling the rotation of the body comprises, as well as the actuators 6, a servo valve 7 which is controlled by a control signal from a control unit 8. The system of the invention is substantially characterised by at least one gyroscope 10 having two degrees of freedom, schematically indicated in FIG. 3, which is fixed to a carriage 1 of the vehicle and which has a first axis of sensitivity 11 dispensed in the longitudinal direction of the carriage, and a second axis of sensitivity 12, disposed in a vertical direction of the carriage. Although the gyroscope schematically represented in FIG. 3 is of the type having two rotating masses m, m', it can be of any other suitable type, even of the type having a single rotating mass. As shown in FIG. 3, there is a set of three orthogonal axes x, y, z disposed in such a way that the x and z axes coincide, respectively, with the axes of sensitivity 11 and 12, and the y axis is oriented transversely to the x and z axes.

The gyroscope 10, according to the invention, is operable to generate a first electrical signal indicative of the angular velocity $\omega_x$ of the carriage about the first axis of sensitivity 11 or x-axis and a second electrical signal indicative of the angular velocity $\omega_z$ of the carriage about its vertical axis. i.e. the second axis of sensitivity z. For purposes which will be indicated more clearly below, on the carriage 1 there are preferably disposed two gyroscopes 10 of the above indicated type. The system further includes at least one tachometric detector 13 (FIG. 1) operable to generate a signal indicative of the speed v of the vehicle, and at least one integrator 14 operable to integrate over time intervals dt the signal indicative of the angular velocity $\omega_x$ emitted by the gyroscope 10 to generate a signal $\int \omega_x dt$ indicative of the angle of rotation $\phi_x$ of the carriage about the longitudinal axis x. Between the gyroscope 10 and the integrator 14 there are disposed a low pass filter 15 and an analogue-to-digital converter 16. A microprocessor, generally indicated 17, forms part of the system, which includes a calculation unit 18 which is operable to form the product of the signal indicative of the angle of rotation $\phi_x$ and the acceleration g due to gravity, and a calculation unit 19 operable to form the product of the signal indicative of the speed v, which is provided by the detector 13, and the signal indicative of the angular velocity $\omega_z$ from the gyroscope 10. Between the tachometric detector 13 and the calculation unit 19 is inserted a conditioner circuit 20 (the purpose of which is that of converting the tachometric signal, typically a frequency signal, into a voltage signal) and between the gyroscope 10 and the calculation unit 19 there is disposed a low pass filter 23, an analogue-to-digital converter 24 and an offset corrector 25. The microprocessor 17 further includes another calculation unit 26 adapted to take the difference between the second product and the first product in such a way as to obtain a signal indicative of the non-compensated transverse acceleration:

$$a_{nc} = \frac{v^2}{R} - g\phi_x$$

The signal thus generated is sent to the control unit 8 to generate the control signal for the servo valve 7.

Figure 6:
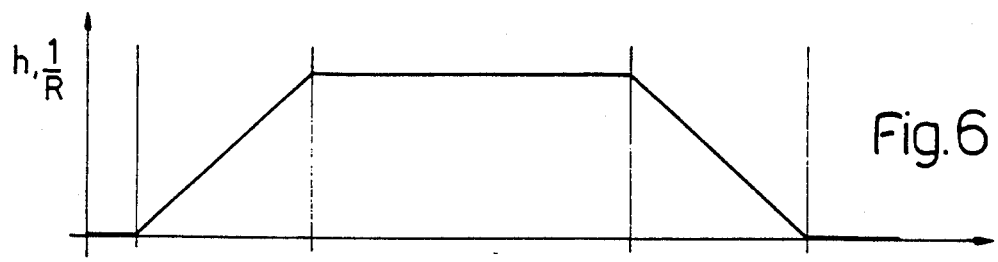

The geometric characteristics of a curve travelled by the vehicle, and of the associated entrance and exit transition sections are given in the diagram of FIG. 6 in which, supposing that the vehicle has a constant speed v, there is plotted, by way of non-limitative example, the variation in the elevation H (FIGS. 4 and 5) of the track and the inverse of the radius of curvature R of the bend as a function of time; the two initial and final inclined sections of the diagram correspond respectively to the entrance and exit transition sections of the bend whilst the central section, of constant value, corresponds to the bend itself. The signal indicative of the non-compensated acceleration $a_{nc}$, which is generated in the manner indicated above, and which comes from the control unit 8, varies as shown in FIG. 8 and corresponds entirely to that of FIG. 6.

Figure 8:
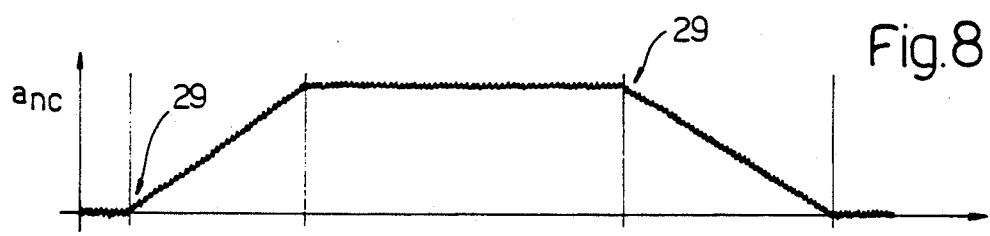

The signal indicative of the non-compensated acceleration generated by the system of the invention is able to control, via the control unit 8 and the servo valve 7, the operation of the actuator 6 both quickly and smoothly: in fact this signal, as is seen from FIG. 8, is perfectly in phase with that of FIG. 6 representative of the geometry of the curve and is emitted immediately the vehicle meets the entry connector link; moreover, since its variation corresponds to that of the acceleration perceived by the passengers it can be effectively utilised to modulate the operation of the actuators 6 which control the rotation of the body.

Figure 7:
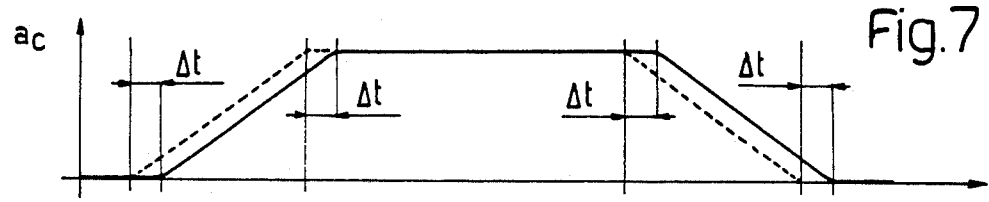

The system of the invention further includes at least one accelerometric detector 27 fixed to the carriage 1 and operable to generate a signal indicative of the transverse acceleration of the carriage, and a low pass filter 31 operable to filter the signal itself and to produce at its output a signal which is delayed with respect to the instant at which the signal indicative of the transverse acceleration is transmitted to the filter itself. In FIG. 7 the variation of this signal as a function of time is shown: as is seen from this figure the diagram is substantially trapezoidal, comprising a first and a third rectilinear section having respectively increasing and decreasing values with an increase in time, and a second, substantially rectilinear section of constant value. This diagram is, however, phase displaced by $\Delta t$ with respect to the instant in time when travelling on the connector link of the curve commences.

Figure 9:
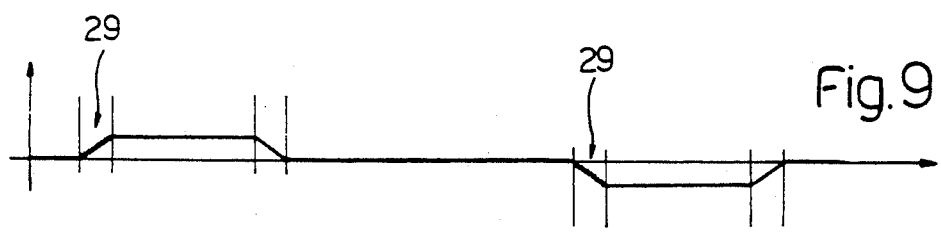
Figure 10:
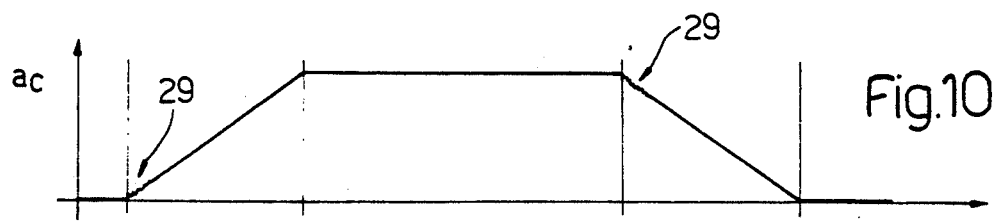
Figure 11:
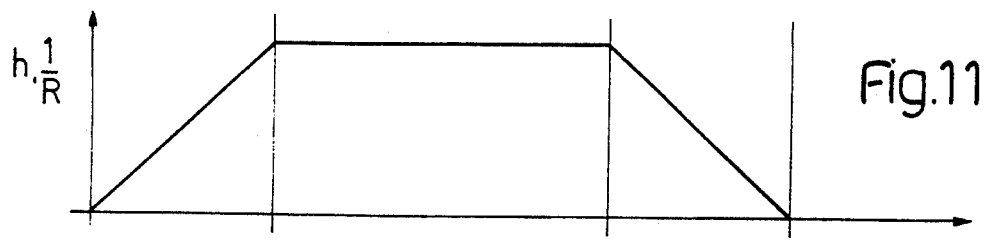

The microprocessor 17 further includes a unit for forming the signal which is operable to form a supplementary signal the variation of which with time has the form of two trapezoidal waves of opposite sign, as has been shown in FIG. 9; the initial inclined section of each of these waves, indicated 29, coincides with the corresponding sections of the signal indicative of the non-compensated transverse acceleration shown in FIG. 8; whilst the duration of each of the sections 29 is substantially equal to the delay $\Delta t$ defined above; a signal-forming unit able to generate a signal with the characteristics of that of FIG. 9 is technically well-known. The microprocessor 17 includes a further calculation unit 30 operable to produce, at each instant, the sum of the values of the signal emitted by the low pass filter 31 (shown in FIG. 7) and the values of the supplementary signal defined above shown in FIG. 9, for the purpose of obtaining a resultant signal, shown in FIG. 10, which is sent to the control unit 8 to generate a corresponding control signal.

The signal thus obtained substantially corresponds to that from the output of the low pass filter 28 and shown in FIG. 7, with the single difference that it is not delayed by the time $\Delta t$; this signal is therefore perfectly in phase with the curve of FIG. 6 and can be utilised effectively by the control unit 8. This latter therefore receives two signals at each instant, one from the calculation unit 26 of the micro-processor 17 and indicative of the non-compensated transverse acceleration (generated from the signals from the gyroscope 10) and a second signal coming from the calculation unit 70 as described above; the second signal can be considered as a reserve signal for substituting in place of the first when, because of any breakdown in the system, the first is not usable.

The system further includes a threshold circuit 34 interposed between the tachometric detector 13 and the control unit 8; it is operable to allow the passage of the tachometric signal to the control unit only when the speed v of the vehicle is greater than a predetermined threshold in such a way that the control unit 8 transmits the control signal to the actuator 7 only if the tachometric value is greater than the value of the said threshold signal. The system also includes:

a second offset corrector 35 to which is sent the signal indicative of the angular velocity $\omega_z$ coming from the gyroscope 10; a second integrator 37 and a differentiator 38 operable to perform, respectively, integration and differentiation of the angular velocity signal coming from the low-pass filter 23 for the purpose of deriving signals indicative respectively of the angle of rotation $\phi_z$ of the vehicle about a vertical axis and of the angular acceleration $d\omega_z/dt$; a phase discriminator 39 which receives the signals emitted by the analog to digital convertors 16 and 24, those from the: integrators 14 and 37 as well as from the differentiator 38; and an enabling unit 40 connected to the phase discriminator 39 and the control unit 8.

The phase discriminator 39 and the enabling unit 40 are arranged to operate in a known manner for the purpose of comparing the values of the signals indicative of the angular velocity $\omega_z$, and the angle of rotation $\phi_x$ and with corresponding threshold values, and to evaluate the persistence within a predetermined range of values of the angular velocity $\omega_x$ and the angular acceleration $d\omega_z/dt$. Whenever it is found that the value of one or more of the said signals indicative of the angular velocity $\omega_z$ and of the angle $\phi_x$ is located above the threshold value ($\omega_{zs}$, $\phi_{xs}$, FIGS. 14 and 13) or whenever the angular velocity $\omega_x$ and/or the angular acceleration $d\omega_z/dt$ persist within said predetermined range of value longer than a predetermined time $\Delta't$; the enabling unit 40 emits an enabling signal to enable the control unit 8.

In this way the control unit 8 is enabled only if particular conditions of the aspect or speed of the vehicle occur.

To take account of how the phase discriminator 39 can operate in association with the enablement unit 40 it is suitable to make reference to the diagrams of Figures from 11 to 16 the first of which corresponds to that of FIG. 6.

Figure 12:
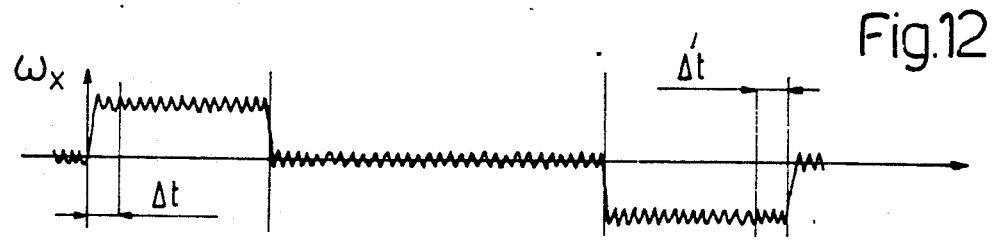
Figure 13:
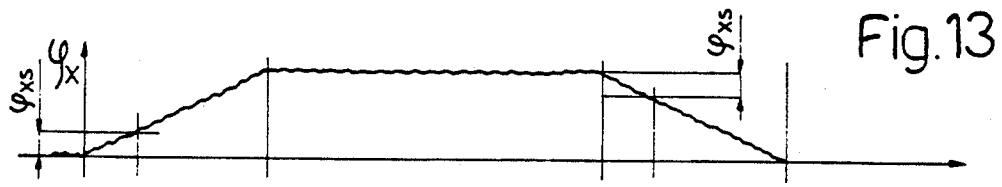
Figure 14:
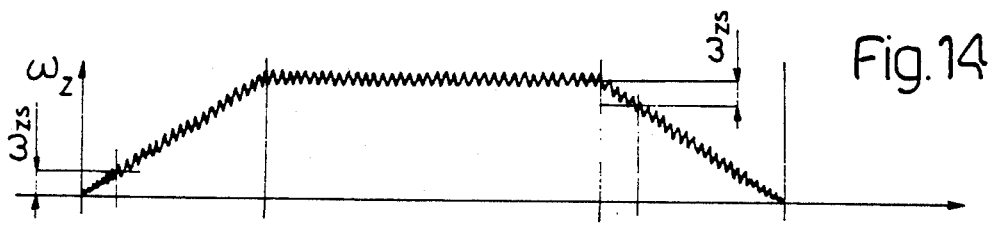
Figure 15:
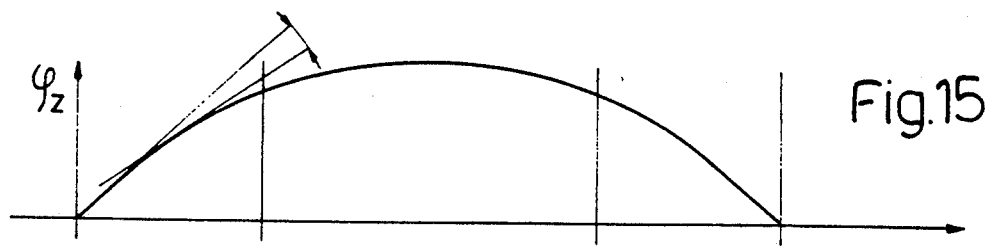
Figure 16:
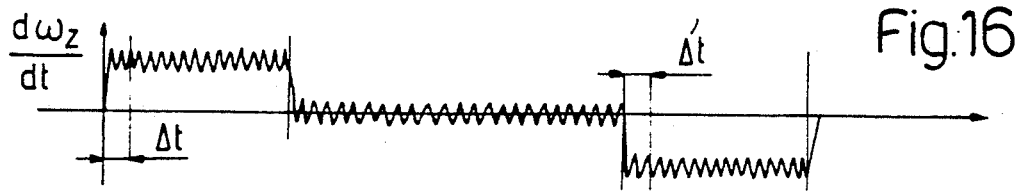

In the diagram of FIG. 12 the variation of the angular velocity signal emitted by the converter 16 is represented whilst in the diagram of FIG. 13 the variation of the signal indicating the angle of rotation $\phi_x$ emitted by the integrator 14 is shown and in the diagram of FIG. 14 the variation of the signal indicating the angular velocity $\omega_z$ emitted by the convertor 24 is shown. FIG. 15 shows the variation of the signal indicating the angle of rotation $\phi_z$ emitted by the integrator 37, and FIG. 16 shows the variation of the signal indicating the angular acceleration $d\omega_z/dt$ emitted by the differentiator 38. Whenever the signals $\omega_x$, $d\omega_z/dt$ remain within a predetermined range of values for a time t as indicated in FIGS. 12 and 16 this confirms that the vehicle is at the beginning of the entrance or exit transition section of the bend; this confirmation is derived whenever the values of the signals $\phi_x$ and $\omega_z$ are greater than the corresponding threshold values $\omega_{zs}$ and $\phi_{xs}$ as has been shown in FIGS. 13 and 14.

According to the system, the signals indicating the angular velocities $\omega_x$, $\omega_z$ and the angles of rotation $\phi_x$, $\phi_z$ as well as the angular acceleration $d\omega_z/dt$ produced respectively by the converters 24 and 16, the differentiators 14 and 37, and the integrator 37, can be delivered to detection and/or control devices for the purpose of detecting or controlling desired running characteristics of the vehicle or of the line when the vehicle passes over entry or exit transition sections of a bend and when it is travelling on the bend itself.

A further accelerometric detector 41 fixed to the body 5 of the vehicle also forms part of the system and is adapted to provide a signal indicative of the residual transverse acceleration $a_{cr}$ acting in the direction of the axis t' of FIG. 5, as well as at least one detector, indicated 42, for detecting the angle of rotation $\theta$ of the body about its longitudinal axis. A further control unit 43 is operable to make a comparison between the signal provided by the accelerometric detector 41 and a reference value depending on the angle of rotation $\theta$ of the body detected by the detector 42 and to emit a disactivation signal for the control unit 8 when the difference between the value of the signal provided by the accelerometric detector and the reference value exceeds a predetermined threshold value.

Finally, the system includes a control unit 44 connected to the filter 31, the integrator 14, the offset corrector 25 and the tachometric detector 13 for the purpose of receiving these signal components indicative, respectively, of the acceleration $a_c$ on the carriage, the angle of rotation $\phi_x$, the angular velocity $\omega_z$ and the speed v; the control unit 44 is further connected to the unit 43.

The unit 44 is prearranged to operate on the signals $\omega_z$, v and $\phi_x$ in the same way as the microprocessor 17 operates, for the purpose of generating a signal indicating the non-compensated acceleration $a_{nc}$. Furthermore, this unit makes the comparison between this signal and that indicating the acceleration $a_c$ coming from the filter 31; whenever there is encountered a difference between the two signals greater than a predetermined threshold value the unit emits a disactivation signal for the control unit 8. In this way control of the signal indicating the non-compensated acceleration $a_{nc}$ generated by the gyroscope 10 is effected; this control is effected when the vehicle is in the full bend.

It is evident that the system of the present invention may have modifications and variations introduced thereto without departing from the ambit of the invention itself.

I claim:

1. A system for a first control unit (8) for controlling rotation of a body (5) of a railway vehicle about its longitudinal axis (L) for reducing non-compensated transverse acceleration acting in a transverse direction on passengers in the body, the rotation being controlled by at least one actuator (6) actuated by a servo valve (7) controlled by a first control signal from the first control unit (8), the system comprising:

at least one gyroscope means (10) having two degrees of freedom for fixing to a carriage (1) of a vehicle and having a first axis (x) of sensitivity disposed in the longitudinal axis of the vehicle and a second axis (z) of sensitivity disposed in a vertical direction, the gyroscope means being arranged for generating a first signal indicating an angular velocity $\omega_x$ of the carriage about the first axis (x) and a second signal indicating an angular velocity $\omega_z$ of carriage about the second axis (z);

at least one tachometric detector means (13) for generating a third signal indicating a longitudinal speed (v) of the vehicle;

at least one first integrator means (14) for integrating the first signal over time intervals dt to generate a fourth signal $\int \omega_x dt$ indicating an angle of rotation $\phi_x$ of the carriage about the first axis (x);

first calculation means (18) for forming a first product of the fourth signal and acceleration g due to gravity;

second calculation means (19) for forming a second product of the third signal and the second signal;

third calculation means (26) for taking a difference between the second product and the first product as a fifth signal indicative of a non-compensated transverse acceleration $a_{nc}$:

$$a_{nc} = \omega_z v - g\omega_x;$$

whereby the fifth signal is used in the first control unit (8) to generate the first control signal;

at least one first accelerometric detector means (27) for fixing to the carriage (1) and generating a sixth signal indicating a transverse acceleration of the carriage, a diagram of the transverse acceleration of the carriage as a function of time comprising substantially a first substantially rectilinear section the value of which increases with an increase in time, a second substantially rectilinear section the value of which remains constant with time, and a third rectilinear section the value of which decreases with time;

low pass filter means (31) for filtering the sixth signal into a seventh signal which is delayed by a delay time interval $\Delta t$ with respect to the sixth signal;

whereby the seventh signal is used in the first control unit (8) to generate the first control signal;

signal-forming means (28) for forming a supplementary signal a variation of which with time has a form of two waves of trapezoidal form of opposite sign in which an initial inclined section of each wave coincides with a corresponding section of the fifth signal, a duration of each of the initial inclined sections being substantially equal to the delay time interval $\Delta t$;

further calculation means (30) for forming at each instant a sum of seventh signal and the supplementary signal as a resultant signal;

whereby the resultant signal is used in the first control unit (8) to generate the first control signal.

2. The system according to claim 1, and further comprising:

threshold circuit means (34) for allowing passage of the third signal directly to the first control unit (8) only when the third signal indicates that the speed (v) is greater than a predetermined threshold value, whereby the first control unit (8) can emit the first control signal only if the speed is greater than the threshold value.

3. The system according to claim 1, and further comprising:

a second integrator means (37) and a differentiator means (38) for, respectively, integrating and differentiating the second signal to derive signals an eighth and a ninth signal respectively indicating the angle of rotation $\phi_z$ of the vehicle about a vertical axis and an angular acceleration $d\omega_z/dt$;

a phase discriminator (39) to which are delivered the first, the second, the fourth, the eighth and the ninth signals;

an enabling unit (40) connected to the phase discriminator (39) and to the first control unit (8);

the phase discriminator (39) and the enabling unit (40) being arranged for comparing values of the second and the fourth signals with corresponding threshold values $\omega_{xs}$ and $\phi_{zs}$ and for evaluating if the first and ninth signals persist for a time $\Delta' t$ within a predetermined range of values and for emitting an output signal from first enabling unit (40) and enabling the first control unit (8) only if the value of at least one of the second and fourth signals is above the threshold value or if the said first and ninth signals persist within said predetermined range of value longer than the predetermined time $\Delta' t$.

4. The system according to claim 3, characterised in that the first, the second, the fourth, the eighth and the ninth signals are delivered to at least one of detection and control devices for, respectively, detecting or controlling operating characteristics of the vehicle when the vehicle passes over transition sections at the entrance and exit of a bend and when running on the bend itself.

5. The system according to claim 3, and further comprising:

at least one accelerometric detector means (41) fixed to the body (5) of the vehicle for providing an tenth signal indicative of a non-compensated acceleration;

at least one detector (42) for detecting an angle of rotation $\phi_x$ of the body about its longitudinal axis;

a second control unit means (43) for comparing the tenth signal to a reference value depending on the angle of rotation $\phi_x$ and emitting a disactivation signal for the actuator when a difference between the tenth signal and the reference value exceeds a predetermined value.

6. The system according to claim 5, and further comprising a third control unit means (44) in series with the second control unit means (43) and connected to the low-pass filter means (31), to the first integrator means (14), to the gyroscope means (10) and to the tachometric detector means (13) for receiving from these components signals indicating respectively an acceleration $a_c$ on the carriage, the angle of rotation $\phi_x$, the angular velocity $\omega_z$ and the speed v of the vehicle, the third control unit means (44) being arranged for generating a generated signal indicating the non-compensated acceleration $a_{nc}$, comparing the generated signal with the resultant signal, and emitting a disactivation signal for the first control unit (8) when a difference of the compared generated and resultant signals exceeds a predetermined threshold value.

* * * * *